Oct. 30, 1962  J. P. SIMON  3,061,243
LIFT FAN SUPPORT ARRANGEMENT FOR AIRCRAFT
Filed Nov. 21, 1960
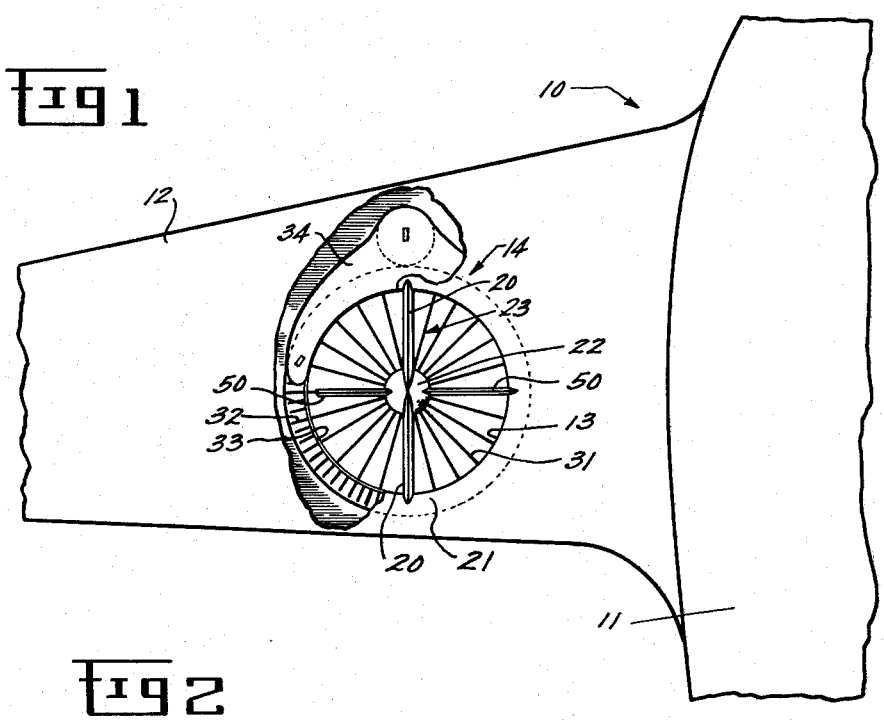
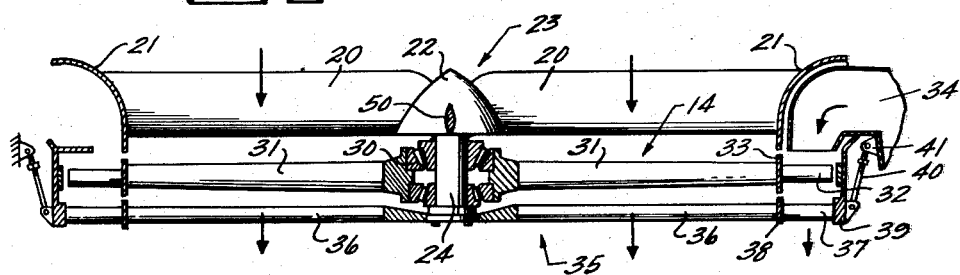
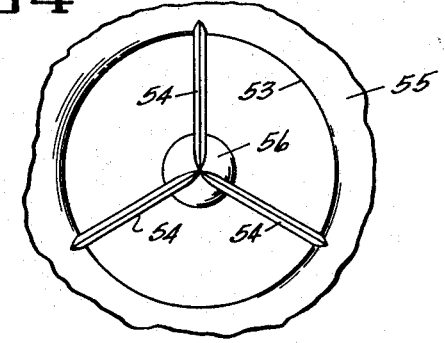
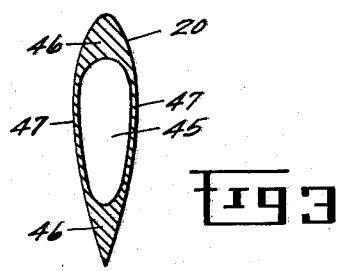
INVENTOR.
JAMES P. SIMON
BY
ATTORNEY United States Patent Office 3,061,243
Patented Oct. 30, 1962

3,061,243
LIFT FAN SUPPORT ARRANGEMENT
FOR AIRCRAFT
James P. Simon, Cincinnati, Ohio, assignor to General
Electric Company, a corporation of New York
Filed Nov. 21, 1960, Ser. No. 70,589
3 Claims. (Cl. 244—23)

This invention relates to aircraft adapted to take off and land in a vertical direction and more particularly relates to a lift fan support arrangement for use in such an aircraft.

Thrust sufficient to raise the weight of an airplane or a similar aircraft structure must be exerted vertically on the airframe in order to lift the aircraft from the ground in a vertical direction. This required thrust is conveniently supplied by means of a lift fan mounted for rotation within a passage extending through the airframe, the lift fan and the passage being positioned so that the thrust produced by the fan is directed vertically. Lift fans of this type are commonly driven by a tip turbine comprising a row of turbine buckets carried on the tips of the lift fan blades about the fan periphery, the tip turbine being driven in turn by hot propelling gases supplied by a gas generator such as, for example, the discharge of a conventional aircraft gas turbine engine.

The thrust produced by the lift fan for lifting the aircraft must be transmitted through the fan mounting or supporting means to the airframe. The support structure used for mounting the fan must be strong enough throughout its entire length to carry the transmitted thrust without failing. Consistent with this required strength, the support structure should also be as light in weight as practically possible in order to reduce the total aircraft weight, thus also reducing the thrust required for lifting the aircraft. A commonly used support comprises a strut extending across the passage in the airframe, the strut having a substantially uniform cross-section throughout its entire length. An end of a rotatable shaft is journalled in a bearing housing located in a cavity provided in the support strut. The lift fan rotor is securely mounted on the rotatable shaft for rotation within the airframe passage. This type of commonly used support structure presents several disadvantages which, although readily apparent, have not been successfully solved in the past. In the first place, the support strut is only as strong as its weakest section and, therefore, must be proportioned so that its weakest section can carry the required thrust load. By providing a cavity in the strut for receiving the rotatable shaft, the strut is severely weakened in the vicinity of the cavity. Therefore, the strut must be made larger and heavier in the vicinity of the cavity to provide adequate strength and, since it is desirable to have a minimum cross-section along the length of the strut, it thus becomes obvious that the design of the strut is more complicated and heavier than necessary. The heavier strut results in undesired additional aircraft weight which must be lifted by the lift fan. Secondly, it has been found in practice that substantial gyroscopic forces are created by the lift fan during aircraft maneuvering, the forces being transmitted through the rotatable shaft to the support strut. It has been additionally found that these forces have a tendency to flatten the bearing housing and crush the bearings located in the support strut cavity. Furthermore, the other end of the rotatable shaft has been commonly supported by stationary blading provided for cooperation with the lift fan blades and the tip turbine buckets. Since this stationary blading must by necessity be secured to the airframe in such an intallation, free expansion and contraction of the blading is prevented with resulting undesirable stresses being set up in the stationary blading.

It is therefore an object of this invention to provide a lift fan support means having substantially minimum section throughout its length.

A further object of this invention is to provide a lift fan support means having a high strength to weight ratio.

An additional object is to provide a bearing assembly for rotatably supporting the lift fan in the airframe opening which is not subjected to gyroscopic forces of destructive magnitudes.

Yet another object is to provide a lift fan and an associated tip turbine having cooperating stationary blading which can freely expand and contract under high temperature operating conditions.

Briefly stated, in accordance with one embodiment of the invention, a support arrangement is provided for rotatably mounting a lift fan in a passage which passes through the airframe of an aircraft adapted to take off and land in a vertical direction. The support arrangement is preferably comprised of a major strut extending across the opening, at least one minor strut also extending across the opening and secured to the major strut, a stationary stub shaft secured to the major strut, and a bearing arrangement on the shaft for rotatably mounting the lift fan. The major strut, which takes substantially all of the thrust load, is rigidly secured to the airframe on opposite sides of the airframe passage and rigidly supports the stationary shaft in the passage. Since no strength reducing cavity is required in the major strut for rotatably mounting the shaft, the strut is proportioned so as to have substantially uniform strength throughout its length and, thus, a high strength to weight ratio. The minor struts are preferably positioned on each side of the major strut and are secured thereto as well as to the airframe, the minor struts securely holding the major strut against twisting when it is subjected to gyroscopic forces created by the lift fan during aircraft maneuvering. The minor struts do not normally take any appreciable portion of the thrust load. By locating the fan supporting bearing on the stationary shaft rather than within a cavity in the support strut, the danger of crushing the bearings or flattening the bearing housing because of the gyroscopic forces is greatly diminished. Stationary blading for cooperation with the lift fan blading and with the turbine buckets carried about the fan periphery is rigidly attached to the unsupported end of the stationary shaft and extends radially outward therefrom across the airframe passage, the outer periphery of the stationary blading being nonrigidly supported from the airframe so that free expansion and contraction can take place.

According to another embodiment of the invention, three or more rigid support struts may be provided instead of the single preferred major strut. The three or more struts join over the passage in the airframe and together rigidly support the stationary shaft. In this embodiment, the support struts not only take the thrust load, but also mutually secure themselves against twisting.

While the specification concludes with claims particularly pointing out and distinctly claiming the subject matter of the invention, it is believed that the invention will be better understood from the following description taken in connection with the accompanying drawings in which:

FIGURE 1 is a partially cut-away view of an aircraft adapted to take off and land in a vertical direction with the lift fan for supplying vertical thrust to the aircraft being supported by the support arrangement of this invention;

FIGURE 2 is a partial section view showing a lift fan and stationary blading mounted on the support arrangement;

FIGURE 3 is a cross-section view of a support member which comprises a portion of the major support strut of the present invention; and FIGURE 4 is a fragmentary schematic view of an alternative strut arrangement.

Referring first to FIGURE 1, an aircraft, generally indicated at 10, adapted to take off and land in a vertical direction is shown having an airframe comprising a fuselage 11 and wings 12 attached to the fuselage 11 and extending outwardly therefrom. An opening or passage 13 preferably positioned in the wing 12 passes entirely through the wing in a vertical direction, the passage 13 receiving a thrust producing lift fan, generally indicated at 14, for lifting the aircraft 10 in vertical flight. It will be understood that similar lift fans could be alternately or additionally located in the fuselage 11.

Now referring to both FIGURES 1 and 2, two support members 20 are rigidly secured at their outer ends to a portion 21 of the airframe on opposite sides of the passage 13 by appropriate fastening means (not shown). The inner ends of the support members 20 are rigidly secured, preferably by welding, to a hub 22 positioned centrally over the passage 13, the hub 22 and the two support members 20 thus being joined to form a rigid major support strut 23 extending entirely across the upper portion of passage 13. It has been found that best results are obtained when the major support strut 23 is positioned across the passage 13 with its major axis extending in the direction of normal flight of the aircraft. A stationary stub shaft 24, as shown in FIGURE 2, is rigidly and non-rotatably secured to the hub 22 and depends therefrom into the passage 13. The lower end of the stub shaft 24 is not supported from the airframe in any way; therefore, under loading, the stub shaft 24 is a cantilevered member supported against deflection at only its upper end.

Rotatably mounted on the stub shaft 24 by a thrust bearing arrangement 30 is a rotor 31, the rotor including the lift fan 14 and a row of turbine buckets 32 carried about the periphery of the lift fan 14. The turbine buckets 32 are positioned on a shroud 33 supported on the outer tips of the lift fan blades, the shroud preventing the hot propelling gases passing through the turbine buckets 32 from mixing with the air passing through the lift fan 14. A gas supply duct such as a scroll 34 directs the hot propelling gases to the row of turbine buckets 32 for rotatably driving the lift fan 14 so as to provide the thrust necessary to lift the aircraft. The thrust produced by the lift fan is transmitted through the thrust bearing arrangement 30 and the stub shaft 24 to the major support strut 23 preferably disposed in a fore and aft direction which, through its rigid connection to the airframe portion 21, transmits the thrust to the airframe for lifting the aircraft 10.

As shown in FIGURE 2, stationary blading, generally indicated at 35, is secured to the unsupported end of stub shaft 24 and extends radially outwardly therefrom across the passage 13. The stationary blading 35 comprises an inner tier 36 of blading for cooperation with the lift fan blading 14, an outer tier 37 for cooperation with the turbine buckets 32, and a shroud 38 similar to shroud 33 to prevent mixing of the gases flowing through the two tiers. The shroud 38 supports the outer tier 37 of stationary blading on the outer tips of the blades of the inner tier 36. A shroud or similar structure 39 is carried on the outer tips of the blades forming the outer tier 37 of the stationary blading 35 and is non-rigidly connected by means of a member such as, for example, movable link 40 to a portion 41 of the airframe. This non-rigid connection permits the stationary blading 35 to expand or contract during aircraft operation about the lower end of stub shaft 24 as a fixed center without any undesirable stresses being set up in the stationary blading 35 while aligning rotating and stationery blading.

In operation, the thrust produced by the lift fan 14 for lifting the aircraft 10 is transmitted through the stub shaft 24 to the major support strut 23. Since stub shaft 24 is non-rotatably supported by the hub 22, there is no strength reducing cavity in the hub 22 with the result being that the support members 20 and the hub 22 may be proportioned so as to provide substantially uniform strength throughout the entire length of the major support strut 23. Therefore, the support members 20 and the hub 22 are designed so as to have the least possible weight consistent with adequate strength.

In order to prevent excessive deflection of the major support strut 23 when it is subjected to thrust loads by the lift fan 14, the support members 20 have a hollow configuration such as that shown in cross-section in FIGURE 3. In FIGURE 3, the support members 20 are shown having an airfoil shape which will reduce possible turbulence in the air passing through the lift fan 14. The interior 45 of the support member 20 is hollow so that the bulk of the weight of the member is concentrated in relatively heavy upper and lower portions 46 of the support member joined by relatively thin web portions 47. Although this type of configuration generally results in good stiffness qualities, it has been additionally found that the major support strut 23 must have a depth or dimension in the direction of the axis of the stub shaft 23 of at least 10% of the diameter of the lift fan 14 and preferably as great as 17% of the diameter. While a 10% dimension has been found to be adequately stiff, a 17% dimension appears to give the optimum combination of both strength and stiffness, as well as a more streamlined configuration.

With the rotor 31 including the lift fan 14 rotating at high speeds during operation of the aircraft 10, large gyroscopic forces are exerted by the rotor 31 through the stub shaft 24 on the major support strut 23 whenever the direction of motion of the aircraft is changed. In order to prevent twisting of the major support strut 23 along its length because of these forces, one or more minor support struts 50 may be provided. As shown by FIGURES 1 and 2 of the drawings, two minor struts preferably, but not necessarily, on each side of the major strut may be utilized. Either of the minor support struts 50 is rigidly secured at one of its ends to the portion 21 of the airframe and is rigidly secured at its other end to the hub 22 of the major support strut 23. While the minor support struts 50 do not carry any appreciable portion of the thrust loads produced by the lift fan 14, they effectively prevent twisting of the major support strut 23 under gyroscopic forces. Although much lighter in weight than the major support strut 23, the minor support struts 50 have a cross-sectional configuration similar to that of the support members 20. It will be obvious that it would be possible to use only one minor support strut 50 instead of the two shown in order to prevent twisting of the major support strut 23.

The gyroscopic forces created by the high speed rotation of the rotor 31 during aircraft maneuvering also tend to crush the bearings and flatten the housing of the bearing arrangement 30. In order to prevent the destruction of the bearing arrangement 30 by these reactions, it has been found necessary to provide a bearing span along the stub shaft 24 of at least 10% of the diameter of the lift fan 14.

It will also be understood that a major support strut could be formed from a single beam rather than from a combination of elements such as the support members 20 and the hub 22 which comprise the described major support strut 23.

Referring now to FIGURE 4, an alternative supporting means is shown for mounting a lift fan in a passage 53 in an airframe. Three support members 54 are rigidly secured at their outer ends to a portion 55 of the airframe and are rigidly secured to a hub 56 centrally located over the passage 53. The support members 54, which are proportioned in accordance with the principles set forth above for providing adequate strength of the support strut 23, are angularly spaced around the passage 53 so as to act together to mutually prevent twisting. Thus, it can be seen that no minor support struts are necessary in this embodiment.

It can be clearly seen that the invention provides a lift fan support arrangement for use in an aircraft adapted to take off and land in a vertical direction in which the support means has a high strength to weight ratio with no areas of substantially reduced strength. Additionally, the support arrangement of this invention will take gyroscopic forces created by the lift fan during maneuvering of the aircraft without being subjected to either excessive deflection or destruction. Also, the present invention makes possible the mounting and alignment of the stationary blading without subjecting the blading to destructive stresses created by expansion and contraction of the blading during the operation of the aircraft.

While other modifications of this invention and changes and substitutions of equivalents which might have been made have not been described in detail, it is desired to cover by the appended claims all such modifications as fall within the true spirit and scope of the invention.

What I claim as new and desire to secure by Letters Patent of the United States is:

1. A lift fan support arrangement for a vertical take-off aircraft comprising, an airframe having a passage for receiving a lift fan, a support structure rigidly secured to said airframe and extending across said passage, a stub shaft secured at only one of its ends to said support structure with the other of its ends projecting into said passage, said support structure having a dimension in the direction of the axis of said shaft of at least 10% of the diameter of the lift fan, and a rotor including a lift fan mounted on said shaft for rotation within said passage, stationary blade structure secured to the unsupported projecting end of said shaft and extending radially outward therefrom, means connected to said airframe supporting the outer periphery of said stationary blade structure so as to permit unrestrained expansion and contraction of said stationary blade structure about said shaft, the thrust created by said lift fan being transmitted through said support structure to said airframe for lifting said aircraft.

2. A lift fan support arrangement for a vertical take-off aircraft comprising, an airframe having a passage for receiving a lift fan, a hub positioned over said passage, two support members each rigidly secured at one of its ends to said airframe and rigidly secured at the other of its ends to said hub, said support members and said hub together forming a major strut extending across said passage in the direction of motion of said aircraft when in normal flight, at least one minor strut rigidly secured at one of its ends to said airframe and rigidly secured at the other of its ends to said hub to prevent twisting of said major strut, a stub shaft rigidly secured at only one of its ends to said hub and depending therefrom into said passage, said major strut having a dimension in the direction of the axis of said shaft of at least 10% of the diameter of the lift fan, a rotor including a lift fan rotatably mounted on said shaft for rotation within said passage, stationary blade structure rigidly secured to the unsupported depending end of said shaft and extending radially outward therefrom, means connected to said airframe supporting the outer periphery of said stationary blade structure so as to permit unrestrained expansion and contraction of said stationary blade structure about said shaft, the thrust created by said lift fan being transmitted primarily through said major strut to said airframe for lifting said aircraft.

3. A lift fan support arrangement as claimed in claim 2 in which said rotor is mounted on a bearing arrangement extending along said shaft for a distance of at least 10% of the diameter of the lift fan.

References Cited in the file of this patent

UNITED STATES PATENTS

| 2,541,098 | Redding | Feb. 13, 1951 |
| 2,868,302 | Peterson | Jan. 13, 1959 |
| 2,876,965 | Streib | Mar. 10, 1959 |
| 2,884,633 | Stahmer | Apr. 28, 1959 |

FOREIGN PATENTS

| 778,855 | Great Britain | July 10, 1957 |

OTHER REFERENCES

Flight Magazine (London), March 20, 1959, page 384.